July 23, 1940. C. A. ROSS Re. 21,516

PACKAGED ROLL AND PROTECTOR THEREFOR

Original Filed May 26, 1936

Inventor

COLIN A. ROSS

By [signature]

Attorney

Reissued July 23, 1940 Re. 21,516

UNITED STATES PATENT OFFICE 21,516

PACKAGED ROLL AND PROTECTOR THEREFOR

Colin A. Ross, Troy, N. Y., assignor to Behr-Manning Corporation, Troy, N. Y., a corporation of Massachusetts Original No. 2,117,995, dated May 17, 1938, Serial No. 81,880, May 26, 1936. Application for reissue March 22, 1940, Serial No. 325,468

3 Claims. (Cl. 206—59)

The invention relates to protectors and with regard to its more specific features to protectors for rolls of sandpaper.

One object of the invention is to provide a protector that shall prevent the damaging of a roll of sandpaper. Another object of the invention is to provide a protector that can readily be manufactured at small expense. Another object of the invention is to facilitate packing of rolls of sandpaper. Another object of the invention is to provide a roll of sandpaper and protectors therefor which can be stood on end without damage. Another object of the invention is positively to protect the edge of a sandpaper roll. Another object of the invention is to provide a construction for protectors according to which protectors of different diameters can quickly be made up. Other objects will be in part obvious or in part pointed out hereinafter.

The invention accordingly consists in the features of construction, combinations of elements and arrangements of parts, as will be exemplified in the structure to be hereinafter described and the scope of the application of which will be indicated in the following claims.

In the accompanying drawing, in which is shown one of various possible embodiments of the mechanical features of this invention, Figure 1 is a plan view of the protector;

Edge damage to a roll of sandpaper is the most serious problem of the manufacturer of sandpaper so far as shipping the same is concerned. If a roll of sandpaper is placed with its axis parallel to the floor of the vehicle, for example a railway car or a motor truck, the danger of damage is very slight, as has been found in actual practice. However, when the freight car or truck is crowded, the railway or truck employees will usually stand the sandpaper rolls on end. In doing so they are apt to drop the rolls and as they usually do not take care to set them down perfectly straight, the blow received at the edge of the roll causes deformation of a few of the outside layers of the abrasive material, producing a crescent shaped cracking. This cracked edge weakens an abrasive drum, cover or belt which is made from the affected portion of the sandpaper. For these and other reasons, edge damage due to shipping is a serious matter to the manufacturer of sandpaper and also abrasive cloth.

Figure 1:
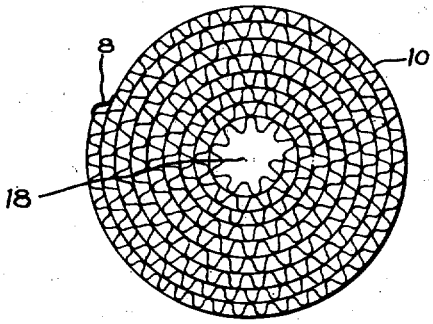
Figure 4:
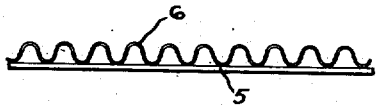
Figure 4 is an edge view of corrugated paper board from which the protector is made.

Referring to Figure 4, I provide a large sheet of corrugated paper board. This corrugated paper board preferably comprises a smooth sheet 5 of suitable paper board to one surface of which is adhesively attached a suitable sheet of paper board 6 which is corrugated as shown, that is to say, having the shape of a continuous series of waves. Preferably I coat one edge of the board parallel to the corrugations with adhesive, for example sodium silicate or glue. I now, and before the adhesive has completely set, place this edge of the corrugated paper board upon a mandrel and then wind the board.

When a cylinder of spirally wound corrugated board has thus been produced, I secure the free end with gummed paper 8. I remove the mandrel and I may now cut disks from the cylinder with a rotary saw or by means of gang saws.

Referring now to the drawing, the numeral 10 designates a protector disk of spirally coiled corrugated paper board, for example of the order of 1 to 2 inches in thickness. I may make a disk of any diameter less than the diameter of the wound cylinder from which the disks were cut, merely by breaking the paper seal 8 and unwinding convolutions of the corrugated paper board, cutting, and resealing with a gummed strip of paper.

Figure 2:
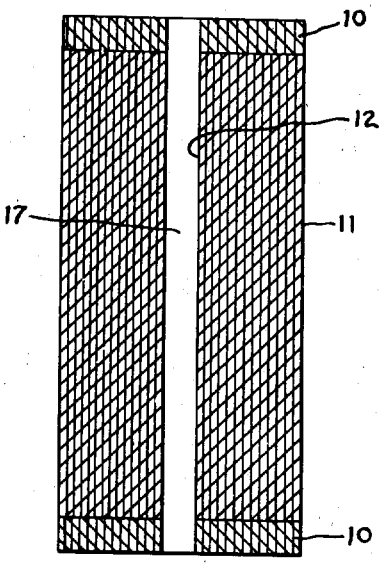
Figure 2 is an axial sectional view of a roll of sandpaper with a protector at each end.
Figure 3:
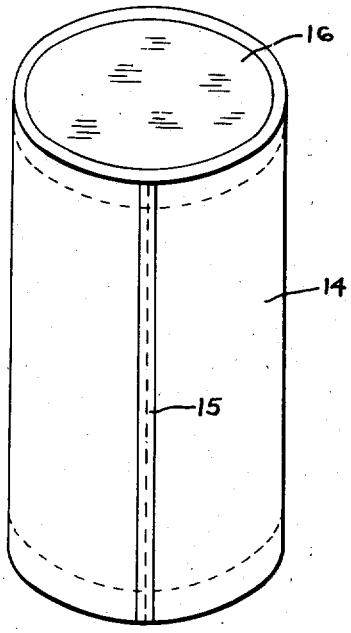
Figure 3 is a perspective view of a package constructed according to the invention and ready for shipping.

There is provided a coiled spirally wound roll of sandpaper or other material 11 which is to be shipped. Referring now to Figure 2, in order not to crush the first convolution of the sandpaper, an axial hole 12 exists in the inside of the sandpaper roll. I now place a protector disk 10 at either end of the roll 11 and wrap the entire assembly in wrapping paper 14, for example kraft paper, sealing the wrapping along an element of the cylindrical roll 11 with gummed paper tape 15 and folding the paper over each disk 10, sealing with gummed circular paper heads 16.

If desired, I may include a long wooden rod 17 in the construction, placing it in the hole 12 with its opposite ends in corresponding central holes 18 of the disk 10. However, in many cases the rod 17 may be omitted or I may substitute short wooden plugs projecting only a short distance into the hole 12 and, if desired, secured in the holes 18 with adhesive, for example glue.

In handling the completed package of the present invention, when it is carelessly thrown into position in the freight car or other vehicle, being allowed to drop with its axis at an acute angle to the vertical, the corrugated board protectors 18 are or may be slightly crushed but at all events receive the shock and because they are non-rigid and also deformable, do not transmit the shock to the sandpaper roll 11 to such an extent as to result in causing the danger heretofore explained. Therefore, the entire package arrives at its ultimate destination without edge damage and in good condition.

The purpose of applying adhesive at the edge 7 to the first convolution at the hole 18 is to permit the forming of a convolution to be received by the mandrel and otherwise to assist in the manufacture of the article. This step and feature may be omitted, if desired.

The protector disk of the invention is easy to manufacture and its size can be readily changed as explained. Furthermore, the material from which it is constructed is cheap. The entire package can be assembled by packers very quickly and the package is a neat package which is easy to handle and presents an excellent appearance.

It will thus be seen that there has been provided by this invention articles in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. A package comprising a cylindrical roll of coated abrasive sheet material, a protective device at an end of the said roll and in juxtaposition thereto, said protective device comprising corrugated board spirally wound and in disk shape, the axis of the spiral being the same as the axis of the roll, and wrapping paper wrapped around the roll and over the protective device, thus securing the protective device to the end of the roll.

2. A protective device for packaged material in cylindrical form comprising a smooth paper board, a paper board with corrugations adhesively attached to said smooth paper board, the two constituting corrugated paper board and being spirally wound and cut off to form a disk which is substantially a right circular cylinder with the corrugations extending parallel to the axis of the cylinder, and means securing the free end of the spirally wound corrugated paper board along a line parallel to the axis of the cylinder to the next underlying convolution of the spiral of the corrugated board.

3. A package comprising a cylindrical roll of material, a protective device at an end of said roll and in juxtaposition thereto, said protective device comprising corrugated board spirally wound and in disk shape, the axis of the spiral being the same as the axis of the roll, and wrapping paper wrapped around the roll and over the protective device, thus securing the protective device to the end of the roll.

COLIN A. ROSS.